United States Patent [19]

Fujikawa et al.

[11] Patent Number: 5,641,444
[45] Date of Patent: Jun. 24, 1997

[54] METHOD OF MANUFACTURING DISK BRAKE PAD

[75] Inventors: Hiroyuki Fujikawa; Yukinori Yamashita; Kazuhiko Mizuguchi, all of Itami, Japan

[73] Assignee: Sumitomo Electric Industries, Ltd., Osaka, Japan

[21] Appl. No.: 425,433

[22] Filed: Apr. 20, 1995

[30] Foreign Application Priority Data

Apr. 26, 1994 [JP] Japan .................................. 6-088614
May 2, 1994 [JP] Japan .................................. 6-093494

[51] Int. Cl.$^6$ .................................................. B29C 71/00
[52] U.S. Cl. ........................ 264/141; 264/236; 264/259
[58] Field of Search .............................. 264/113, 236, 264/259, 260, 5, 141

[56] References Cited

U.S. PATENT DOCUMENTS 5,413,194  5/1995  Kulis, Jr. et al. .

FOREIGN PATENT DOCUMENTS

| 423 057 | 4/1991 | European Pat. Off. . |
| 29 28 527 | 1/1981 | Germany . |
| 2 003 088 | 3/1979 | United Kingdom . |
| 2 260 173 | 4/1983 | United Kingdom . |
| 2 190 968 | 12/1987 | United Kingdom . |
| 83/02651 | 8/1983 | WIPO . |

OTHER PUBLICATIONS

Abstract of Japanese Kokai No. 54-113649 (May 9, 1979).
Abstract of JP 5-331452 (Dec. 14, 1993).
Abstract of JP 6-74267 (Mar. 15, 1994).

*Primary Examiner*—Christopher A. Fiorilla
*Attorney, Agent, or Firm*—Wenderoth, Lind & Ponack

[57] ABSTRACT

A method of forming a disk brake pad having a friction member composed of a bonding layer having a low porosity and a matrix layer having a high porosity and laminated on the bonding layer. The method does not require a preforming step. A material formed by pelletizing a mixture of components for the friction member and a non-pelletized material are fed one after the other into a cavity defined by a mold and a back plate. Also, since the pelletized material is compacted beforehand, the bonding layer formed from the pelletized material exhibits a sufficiently low porosity, so that the bonding layer can prevent moisture from infiltrating therethrough. Thus, the back plate is less likely to develop rust. Also, the bonding strength between the back plate and the bonding layer is improved. Further, since pelletized material forming the bonding layer penetrates into the matrix layer in a complicated manner, the bond strength between the bonding layer and the matrix is also improved.

8 Claims, 2 Drawing Sheets

METHOD OF MANUFACTURING DISK BRAKE PAD

BACKGROUND OF THE INVENTION

The present invention relates to a method of manufacturing disk brake pads for brakes of various vehicles including automobiles and other industrial machines, and highly reliable brake pads manufactured by the method.

Generally, disk brake pads are formed to a metal back plate by bonding a friction member (liner) to a metal back plate. The friction member is formed by binding together reinforcing fibers such as inorganic fibers including mineral fibers, steel fibers, glass fibers, ceramic fibers or their composites, or composites of such inorganic fibers and organic fibers such as aramid fibers, friction adjusting agents such as graphite and barium sulfate, and fillers by means of a thermosetting binder such as a phenolic resin.

Not only do such pads have to be high in friction coefficient and wear resistance of their friction members, but also the bond strength between the friction member and the back plate has to be maintained stably so that the friction member will not peel off the back plate.

In order to prevent cracks that may develop at the interface between the friction member and the back plate due to differences in thermal expansion resulting from braking heat, it is an ordinary practice to interpose a bonding layer having a heat insulating and a damping function between the friction member and the back plate. Since back plates are formed from a ferrous material, it is necessary to take suitable measures to prevent rusting on the joint area between the back plate and the friction member. Otherwise, the bond strength between these members would lower as rusting progresses.

Rusting on the joint surface begins to progress when the friction member of the pad contains water with prolonged use and the water content reaches the back through pores in the friction member. If the porosity in the friction member is sufficiently low, rusting factors such as water cannot reach the interface, so that rusting can be avoided. Another conventional means to prevent rusting is to subject the back plate to dacrotizing treatment. But this is rather expensive. Thus, in order to prevent rusting, it is more advantageous to reduce the porosity to prevent water from permeating into the friction member.

But it is necessary to keep the porosity above a predetermined level at the frictional contact surface of the friction member. Otherwise, its frictional surface would be heated up excessively. This leads to increased production of decomposition gases such as organic gases and a dramatic reduction in its friction coefficient. In order to avoid this, non-asbestos pads should have a porosity of about 15%, which is too high to effectively prevent the water content from reaching the interface.

We, the present inventors, examined friction members having multi-layered structures comprising a frictional contact portion having a porosity higher than a predetermined level, and a bonding layer adjacent to the back plate and having a lower porosity. A friction member having such a multi-layered structure, i.e. a friction member whose porosity changes in the direction of thickness, is disclosed in Unexamined Japanese Patent Publication 56-167929.

The pad disclosed in the above publication is manufactured by pre-forming a tablet having a higher density and a tablet having a lower density, superimposing them, and heating them. This method requires a facility for pre-forming and is low in productivity and high in production cost.

Such pre-formed tablets are flat at their joint surfaces, so that their reinforcing materials cannot show sufficient reinforcing effect at their interfaces. The pad thus formed tends to be low in bond strength between layers and thus low in resistance to separation between layers.

An object of the present invention is to provide a method of manufacturing disk brake pads which effectively solves these problems, and to provide pads formed by this method which are less likely to suffer separation between layers.

Another object of the present invention is to provide a fiber-containing pelletized material used for the production of disk brake pads and its manufacturing method.

SUMMARY OF THE INVENTION

According to the present invention, a method of manufacturing a disk brake pad is disclosed and includes the steps of putting a plurality of portions of a material for a friction member which is a mixture of reinforcing fibers, an organic and inorganic filler, and a binder resin into a cavity defined between a mold and a back plate so as to stack the portions in a plurality of layers in the cavity. The layer that is in contact with the back plate is a bonding layer formed from a pelletized material. The material, including the pelletized material, is then thermoformed in the cavity under pressure, and then the material is dried by heating.

The organic fillers contained in the pelletized material should preferably be styrene-butadiene rubber (SBR), acrylonitrile-butadiene rubber (NBR), acrylic rubber (ACM), butyl rubber (IIR), isoprene rubbber (IR), butadiene rubber (BR), urethane rubber, ethylene-propyrene rubber (EPM), silicon rubber or other unvulcanized rubbers which soften by heat. Such rubber should preferably have a Mooney viscosity at 100° C. of 20 to 150. The pelletized material should preferably contain a total of 15–40% by volume of rubber and binder resin.

The binder resins should be ones which fluidize at a temperature of 60° C.–200° C., such as phenol resin, epoxy resin, polyimide resin and melamine resin.

The friction member of the disk brake pad according to the present invention, which is manufactured by the above method has a multi-layered structure, and one of the layers of the friction member that is in contact with the back plate is a bonding layer formed from a pelletized material and having a top joint surface which penetrates into a layer on the bonding layer in a complicated manner.

The fiber-containing pelletized material according to the present invention, which is used as a material for a disk brake pad, is formed by mixing at least one of inorganic fiber, organic fiber and metal fiber, and rubber powder and thermosetting resin powder and an organic or inorganic filler. It has an average pellet diameter between 0.1 mm and 3 mm. The rubber powder and the thermosetting resin powder deform or melt by heat and serve as a binder to maintain the material in the shape of pellets.

Such pelletized material is formed by mixing at least one of organic fiber, inorganic fiber and metal fiber, with rubber powder and thermosetting resin powder, and an organic or inorganic filler. The resulting mixture is then fed onto an extruding plate heated to a temperature between 60° C. and the setting temperature of the thermosetting resin in an unhumidified state. The material is extruded under pressure through holes formed in the extruding plate, and the extruded material is cut to a predetermined size.

The extruding plate should be heated to a temperature between 80° C. and 120° C., and the material should be extruded under a pressure between 1 kg/cm$^2$ and 100 kg/cm$^2$.

Since the mixture of materials is compacted when pelletized, the bonding layer, which is formed from such pellets, has a lower porosity after heat compression molding than the other layers of the friction member. Thus, it is possible to prevent the infiltration of water by the bonding layer having a low porosity, while keeping a sufficiently high porosity in the frictional contact portion.

The use of the pelletized material makes it possible to form some layers from the pelletized material, which have a low porosity, and simultaneously form the other layers from non-pelletized or pelletized material having a higher porosity. There is no need to pre-form materials and thus no need for any pre-forming facility. The bonding layer has a porosity which is uniform at any part thereof and lower than those of the other layers.

When the materials for forming the upper layer are put on the pelletized material forming the bonding layer in the cavity, the material forming one layer penetrates into the materials forming the adjacent layers in a random fashion. As a result, the interfaces between layers will practically disappear. Since this state remains unchanged after heat-press-forming, the respective layers are strongly bonded together. Thus, it is possible to practically eliminate the possibility of separating not only between the friction member and the back plate due to rust, but also between layers in the friction member.

Also, conventional mixtures of materials for friction members ordinarily contain cotton-like fiber and are difficult to handle. In the present invention, pellets are used. Pellets are much easier to handle and produce little dust.

Such pellets may be formed using any conventional pelletizer including mixer type, compression type and extrusion type. It is preferable that the pellets contain rubber such as unvulcanized styrene-butadiene rubber (SBR), acrilonitrile-butadiene rubber (NBR), acrylic rubber (ACM), isoprene rubber (IR), butadiene rubber (BR), because such rubbers soften when heated and improve the fluidity of the entire material mixture when pelletizing it. This makes it possible to freely control the porosity of pelletized material by unhumidified extrusion pelletizing. Namely, it is possible to form pelletized materials having different porosity from one another by adjusting the fluidity of the material mixture and the extrusion pressure. This suggests the possibility of forming all the materials to be placed in the cavity of the mold from pelletized materials having different porosity from one another. In this case, there is no particular limitation as to the distribution of porosity in the layers other than the bonding layer.

The pelletized material forming the bonding layer should preferably contain a total of 15–40% by volume of rubbers and binder resins. If the content is less than 15%, the bond strength will be low. At more than 40%, the production of gases when forming will increase to such a level as to impair the forming operation. Most preferably, the total content of these components should be 20–30%.

Since the pelletized material according to the present invention contains no liquid for producing fluidity, the thermosetting resin will suffer little degrading. If the material were humidified by water, the material could not retain the shape of pellets because the rubber and resin components never deform or melt. According to the present invention, the rubber powder and thermosetting resin powder deform or melt by heat to turn to a kind of binders, thereby retaining the shape of pellets. Further, since the resin is not thermosetting, it is possible to mold a single material.

In the method of manufacturing a pelletized material according to the present invention, the rubbers in the material will soften and the thermosetting resin melt by heat conducted from the extruding plate, so that the fluidity of the material increases to a level necessary for extrusion. Thus, it is possible to extrude the material without the need to humidify the material by adding a liquid, which would thus require drying after pelletizing. Since no humidifier is used for extrusion, the quality of the end product is not impaired.

The pellet diameter should be between 0.1 mm and 3 mm. If less than 0.1 mm, the pellets would produce dust. If more than 3 mm, it would become difficult to place the pellets uniformly in the mold. This leads to increased dimensional errors in the end product. The pellet diameter should preferably be from 0.5 mm to 2 mm.

If rubbers having a Mooney viscosity of less than 20 at 100° C. are used, the strength of the pelletized material would be insufficient. Rubbers having a Mooney viscosity of more than 100 would not soften sufficiently when pelletizing by extrusion. Thus, the Mooney viscosity of rubbers should be between 20 and 100.

The extruding plate should be heated to at least 60° C. Below 60° C., the rubbers would not soften sufficiently to increase the fluidity of the material. But if it were heated to a temperature above the thermosetting temperature of the resin, the resin would set, making the forming of the material difficult. In either case, smooth pelletizing is impossible. Preferably, the extruding plate should be heated to a temperature between 80° C. and 120° C. The pressure applied to the material at such a temperature should be between 1 kg/cm$^2$ and 100 kg/cm$^2$. Within this range, it is possible to extrude the material at a rate between 0.1 kg/hour and 10 kg/hour per square centimeter of the area of the holes formed in the extruding plate. Thus, the productivity is sufficiently high.

As the thermosetting resin, it is preferable to use one having a melting point (when unset) between 60° C. and 200° C. If less than 60° C., the strength of the pelletized material would be low. If more than 200° C., the rubbers in the material would degrade when forming the end product.

According to the method of the present invention, it is possible to form a friction member comprising at least two layers having different porosities on a back plate of a pad without the need of pre-forming. Thus, it is possible to form a bonding layer having a low porosity with high efficiency and at low cost. By reducing the porosity of the bonding layer, it is possible to prevent the back plate from rusting and thus to increase the bond strength between the back plate and the friction member.

The brake pad formed by this method is less likely to develop rust on the joint area between the back plate and the friction member. Thus, the bond strength between the bonding layer and the back plate is kept high. The bond strength between the bonding layer and the substrate is similarly very high. Thus, separation rarely occurs between the friction member and the back plate or between the layers of friction member, so that the brake pad of the present invention can maintain high performance over a long period of time.

Other features and objects of the present invention will become apparent from the following description made with reference to the accompanying drawings, in which:

DETAILED DESCRIPTION OF THE PREFERRED EMBODIMENT

EXAMPLES 1–4

Figure 1:
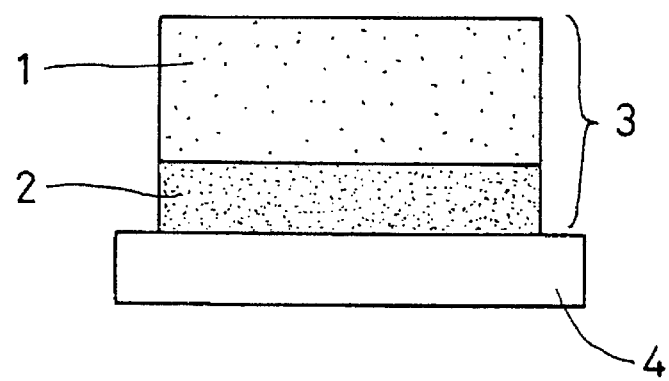
FIG. 1 is a side view of one example of a disk brake pad manufactured by the method according to the present invention.

FIG. 1 shows an embodiment of a disk brake pad including a friction member 3 having a double-layer structure. In the figure, numeral 1 indicates a substrate layer as the frictional contact portion. 2 indicates a bonding layer through which the substrate layer 1 is to be bonded to a back plate 4. The bonding layer 2 is, in many cases, inserted into a recess or a hole formed in the back plate. Here, the bonding layer 2 was simply bonded to the surface of a flat back plate having no recess or hole. Six test specimens were manufactured having this structure. Namely, four of the six test specimens were Examples 1–4, while the remaining two were Control Examples 1 and 2.

The friction members of the pads of Examples 1–4 were formed from the materials shown in Table 1, while those of the pads of Control Examples 1 and 2 were formed from the materials shown in Table 2.

The respective pads were formed in the following manners:

(i) Pads of Examples 1–4

As the material for the substrate layer, we used a mixture obtained by adding fibers, friction adjusting agents, fillers and binder resins shown in Table 1 at the contents shown in this table into an Eirich mixer and mixing them uniformly. As the material for the bonding layer, we used a pelletized material obtained by uniformly mixing the ingredients shown in Table 2 also in an Eirich mixer and pelletizing the mixture.

To pelletize the mixture, we used a disk pelleter made by Fuji Paudal. The non-humidified material mixture was extruded under pressure from the extruding holes formed in the heated extruding plate of the pelleter, and the extruded mixture was cut into small pieces.

Figure 2:
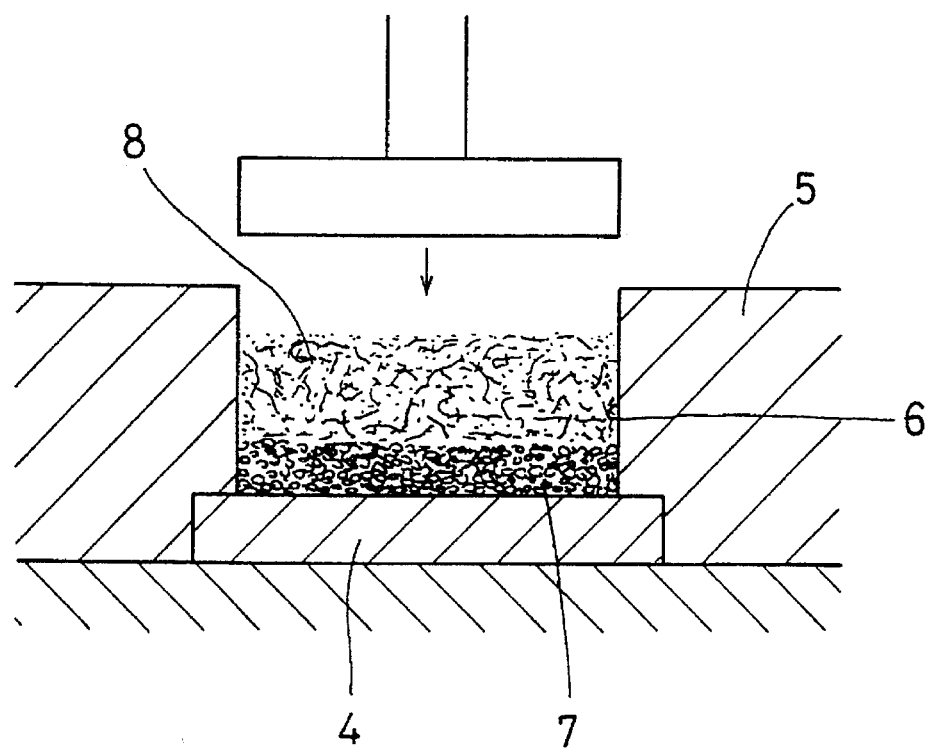
FIG. 2 is a view showing one step of the method of manufacturing the pad of FIG. 1 according to the present invention.

As shown in FIG. 2, the friction member was thermoformed by placing 10 g of a pelletized material 7 to be formed into the bonding layer and then 100 g of a mixture 8 to be formed into the substrate layer into a cavity 6 of a mold 5 heated to 160° C. with the back plate 4 set under the cavity 6, pressurizing them at 200 kg/cm² for 10 minutes, and finally by heating them at 230° C. for three hours to harden or set the thermosetting binder resin contained in the material.

CONTROL EXAMPLES 1 and 2

(ii) Pad of Control Example 1

The materials for both the substrate layer and the bonding layer were formed by adding the ingredients shown in Table 2 into an Eirich mixer at the contents shown in Table 2 and uniformly mixing them together. The mixtures thus formed were not pelletized. 10 g of the mixture for the bonding layer was used while 100 g of the mixture was used to form the substrate layer as in Examples 1–4. The pad of Control Example 1 was formed at the same mold temperature and under the same thermoforming conditions and the same hardening conditions as in Examples 1–4.

(iii) Pad of Control Example 2

The bonding layer was formed by pelletizing the material for the bonding layer as in Examples 1–4. The pad of this example was formed under exactly the same conditions as in the Examples except that the composition for the pelletized material is different.

We measured the porosity of the substrate layer and the bonding layer of the friction member for each of the pads obtained by the above methods.

We also measured the shear strength of the friction member and the degree of rusting on the joint surface between the back plate and the friction member.

To measure the degree of rusting, we repeated 100 times the cycle of immersing each pad in salt water for one hour, drying, heating at 200° C., and leaving it at room temperature. Then, we peeled the back plate and measured the area of the rusted portion of the joint surface.

The results of measurements are shown in Table 3.

As will be apparent from Table 3, the pads of Example 1–4 were much lower in the porosity of the bonding layer than the conventional pad (Control Example 1) in which the bonding layer was formed from a cotton-like material. Thus, the bond strength at the interface between the friction member and the back plate is less likely to drop due to rusting with time. The strength at the bonded portion was also substantially high. This means that the pads of Examples 1–4 are less likely to separate.

Due to the low total content of rubber and binder resin, Control Example 2 was low in the porosity of the bonding layer even though it was formed under the same conditions as Examples 1–4. Thus, it was low in strength and it could not effectively prevent rusting.

Tables 4 and 5 show the kinds and amounts of materials used in Examples and Control Examples. They were formed in the following ways.

EXAMPLE 5

The substrate and the bonding layer were formed by putting the materials shown in Tables 4 and 5 in an Eirich mixer at the contents shown in Tables 4 and 5 and uniformly mixing them together.

The mixtures thus formed were fed into a disk pelleter (FIG. 3) made by Fuji Paudal after heating its extruding plate having 1-mm diameter holes to 60° C., and extruded under the pressure of 20 kg/cm² to form pellets having an average diameter of 1 mm. The pellets produced no dust. It was possible to weigh such pellets simply by putting them in a container and scraping off the portion which heaps up from the brim of the container.

10 g of such pellets were put in a mold heated to 160° C., and then, 100 g of the mixture of materials for the substrate layer was put in the same mold. They were pressurized at 200 kg/cm² for 10 minutes. The article thus molded was hardened at 230° C. for three hours to form a brake pad. Table 7 shows the physical properties of this pad. This pad was lower in porosity of the bonding layer, higher in strength, and less likely develop rust than a conventional pad formed from a cotton-like mixture of materials.

EXAMPLES 6–9

Pellets were formed from the materials shown in Table 4 under the same conditions as in Example 5, but changing the diameter of the pellets by adjusting the diameter of the holes formed in the extruding plate. Brake pads were formed from these pellets in the same manner as in Example 5. As shown in Table 7, these brake pads were lower in porosity of the bonding layer, higher in strength, and less likely to develop rust than a conventional pad formed from a cotton-like mixture of materials.

CONTROL EXAMPLE 3

The substrate and bonding layers were formed from the materials shown in Tables 5 and 6. The materials for both the substrate and bonding layers were mixed uniformly in an Eirich mixer. 10 g of the non-pelletized mixture of materials for the bonding layer and 100 g of the mixture of materials for the substrate layer were put in a mold heated to 160° C., and pressurized at the pressure of 200 kg/cm² for ten minutes. The article thus molded was hardened at 230° C. for three hours. Table 7 shows the physical properties of the pad thus formed. This pad was higher in the porosity of the bonding layer, lower in strength and more likely to degrade by rusting than the pads of which the bonding layer is formed from pelletized material.

CONTROL EXAMPLE 4

The materials shown in Table 6 were uniformly mixed in an Eirich mixer. We tried to pelletize the mixture thus obtained using the same apparatus used for Examples but not heating the extruding plate. We failed to form pellets because the extruding plate clogged.

CONTROL EXAMPLE 5

Pellets were formed from the materials shown in Table 6 in the same manner as in Example 5 using an extruding plate having 5-mm diameter holes. Brake pads were formed by putting the pellets in a mold. It was difficult to obtain the pellets of uniform weight due to large pellet diameter. The brake pads thus formed were not of uniform quality.

CONTROL EXAMPLE 6

Pellets were formed from the materials shown in Table 6 in the same manner as in Example 5 using an extruding plate having 1.5-mm diameter holes. We tried to form brake pads from these pellets in the same manner as in Example 5, but failed.

Figure 3:
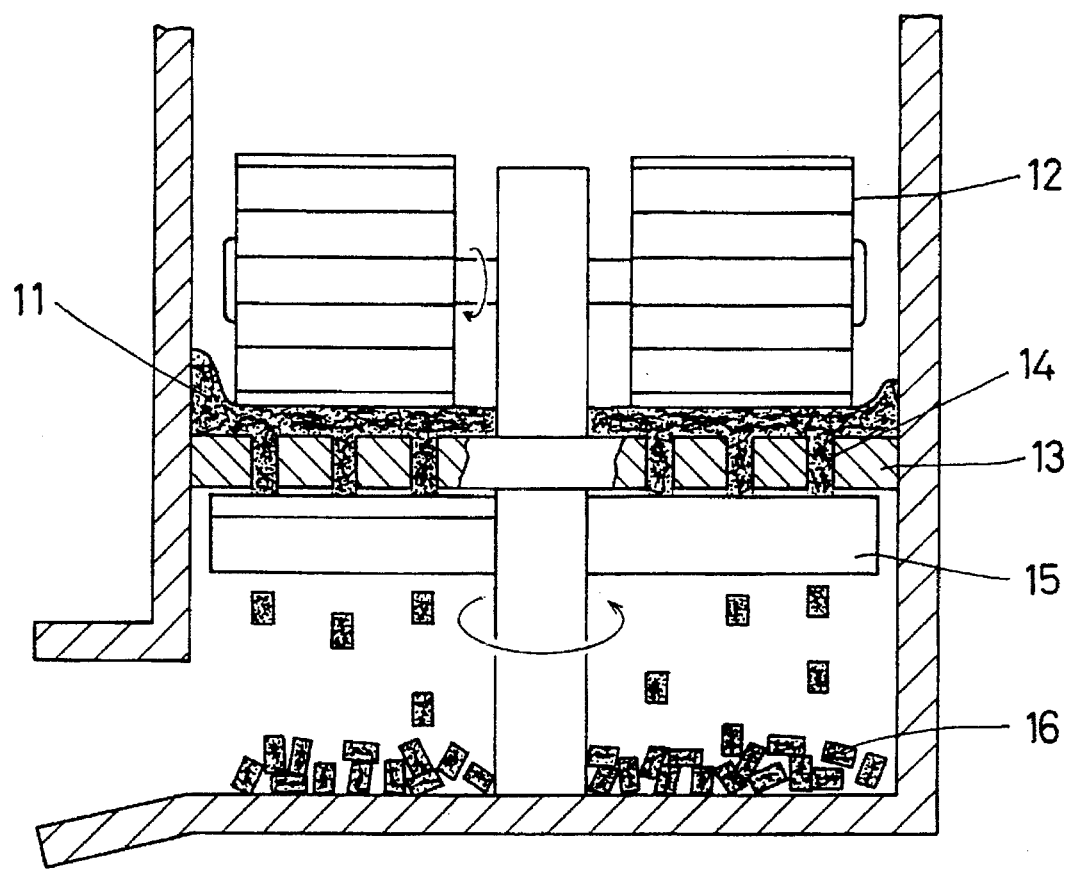
FIG. 3 is a sectional view of a disk pelleter used in the method of the present invention.

The disk pelleter shown in FIG. 3 comprises rollers 12 for pressing the material 11, an extruding plate 13 having holes 14 through which the material 11 is extruded, and a chopper 15 for cutting the material extruded from the extruding plate to a predetermined length.

TABLE 1

| Material | | Content (vol %) | | | | |
|---|---|---|---|---|---|---|
| | | | Bonding layer | | | |
| | | Substrate | Example 1 | Example 2 | Example 3 | Example 4 |
| Fiber | Aramid | 10 | 15 | 15 | 15 | 15 |
| | Copper | 5 | 5 | 5 | 5 | 5 |
| | Ceramic | 10 | 20 | 20 | 20 | 20 |
| Friction adjusting agent and filler | Graphite | 5 | 5 | 5 | 5 | 5 |
| | Cashew dust | 15 | 5 | 5 | 5 | 5 |
| | Calcium hydroxide | 2 | 2 | 2 | 2 | 2 |
| | Barium sulfate | 33 | 23 | 13 | 18 | 18 |
| Unvulcanized rubber | SBR | — | 5 | 10 | — | — |
| | NBR | — | — | — | 5 | — |
| | IR | — | — | — | — | 5 |
| Binder resin | Phenolic resin | 20 | 20 | 25 | — | — |
| | Polyimide resin | — | — | — | 25 | 25 |
| Extrusion pressure (kg/cm²) | | | 10 | 10 | 10 | 10 |

TABLE 2

| Material | | Content (vol %) | | |
|---|---|---|---|---|
| | | | Bonding layer | |
| | | Substrate | Control Example 1 | Control Example 2 |
| Fiber | Aramid | 10 | 15 | 15 |
| | Copper | 5 | 5 | 5 |
| | Ceramic | 10 | 20 | 20 |
| Friction adjusting agent and filler | Graphite | 5 | 5 | 5 |
| | Cashew dust | 15 | 5 | 5 |
| | Calcium hydroxide | 2 | 2 | 2 |
| | Barium sulfate | 33 | 23 | 35 |
| Unvulcanized rubber | SBR | — | 5 | 3 |
| Binder resin | Phenolic resin | 20 | 20 | 10 |

TABLE 3

| | Example | | | | Control Example | |
|---|---|---|---|---|---|---|
| | 1 | 2 | 3 | 4 | 1 | 2 |
| Porosity (substrate) % | 15 | 15 | 15 | 15 | 15 | 15 |
| Porosity (bonding layer) % | 2 | 1.5 | 2.5 | 2.5 | 10 | 30 |
| Degree of rusting | slight | very slight | slight | very slight | marked | marked |
| Shear strength (kg/cm²) | 100 | 110 | 80 | 100 | 70 | 10 |

TABLE 4

| Material | | Content (vol %) in bonding layer | | | | |
|---|---|---|---|---|---|---|
| | | Example 5 | Example 6 | Example 7 | Example 8 | Example 9 |
| Fiber | Aramid fiber | 15 | 15 | 15 | 15 | 15 |
| | Copper fiber | 5 | 5 | 5 | 5 | 5 |
| | Ceramic fiber | 20 | 20 | 20 | 20 | 20 |
| Filler | Graphite | 5 | 5 | 5 | 5 | 5 |
| | Cashew dust | 5 | 5 | 5 | 5 | 5 |
| | Calcium hydroxide | 2 | 2 | 2 | 2 | 2 |
| | Barium sulfate | 13 | 23 | 18 | 28 | 13 |
| Rubber powder | Mooney viscosity | | | | | |
| | SBR 50 | 5 | 5 | | | |

TABLE 4-continued

| | | Content (vol %) in bonding layer | | | | |
|---|---|---|---|---|---|---|
| Material | | Example 5 | Example 6 | Example 7 | Example 8 | Example 9 |
| | NBR 70 | | | | 5 | 10 |
| | IR 60 | | | | | 10 |
| Thermoset resin | Phenolic resin | 30 | 20 | | | |
| | Polyimide resin | | | 25 | | |
| | Epoxy resin | | | | 10 | |
| | Melamine resin | | | | | 25 |
| Average diameter of pellet (mm) | | 1 | 1.5 | 2 | 3 | 1 |

TABLE 5

| Material | | Content (vol %) Substrate |
|---|---|---|
| Fiber | Aramid fiber | 10 |
| | Copper fiber | 5 |
| | Ceramic fiber | 10 |
| Friction adjusting agent and filler | Graphite | 5 |
| | Cashew dust | 15 |
| | Calcium hydroxide | 2 |
| | Barium sulfate | 33 |
| Binder resin | Phenolic resin | 20 |

TABLE 6

| | | Content (vol %) in bonding layer Control Example | | | |
|---|---|---|---|---|---|
| Material | | 3 | 4 | 5 | 6 |
| Fiber | Aramid fiber | 15 | 15 | 15 | 15 |
| | Copper fiber | 5 | 5 | 5 | 5 |
| | Ceramic fiber | 20 | 20 | 20 | 20 |
| Filler | Graphite | 5 | 5 | 5 | 5 |
| | Cashew dust | 5 | 5 | 5 | 5 |
| | Calcium hydroxide | 2 | 2 | 2 | 2 |
| | Barium sulfate | 23 | 23 | 23 | 38 |
| Rubber powder | SBR | 5 | 5 | 5 | 5 |
| Thermoset resin | Phenolic resin | 20 | 20 | 20 | 5 |
| Average diameter of pellet (mm) | | — | 1 | 5 | 1.5 |

TABLE 7

| | Example | | | | | Control Example |
|---|---|---|---|---|---|---|
| | 5 | 6 | 7 | 8 | 9 | 3 |
| Porosity (substrate) % | 15 | 15 | 15 | 15 | 15 | 15 |
| Porosity (bonding layer) % | 2 | 1.5 | 2.5 | 2.5 | 2.0 | 10 |
| Rusting | slight | very slight | slight | very slight | slight | marked |

TABLE 7-continued

| | Example | | | | | Control Example |
|---|---|---|---|---|---|---|
| | 5 | 6 | 7 | 8 | 9 | 3 |
| Shear strength (kg/cm$^2$) | 100 | 110 | 90 | 100 | 95 | 70 |

What is claimed is:

1. A method of manufacturing a disk brake pad having a friction member and a back plate, said method comprising:

mixing at least one of an inorganic fiber, an organic fiber and a metal fiber with rubber powder, thermosetting resin powder, and an organic or inorganic filler;

feeding the mixture, in an unhumidified state, onto an extruding plate which is heated to a temperature between 60° C. and a setting temperature of the thermosetting resin powder;

extruding the non-humidified material mixture under pressure through holes formed in the extruding plate;

cutting the extruded mixture into pellets of a predetermined size to form a pelletized material;

placing the pelletized material into a cavity formed by the back plate and a mold so that the pelletized material contacts the back plate to form a bonding layer;

mixing reinforcing fibers, an organic or inorganic filler, and a binder resin to form a substrate material;

placing the substrate material into the cavity to form a substrate layer on top of the bonding layer;

compressing and heating the pelletized material and the substrate material in the cavity to form a molded friction member secured to the back plate; and heating the molded friction member for a period of time in order to cure the molded friction member.

2. A method of manufacturing a disk brake pad as claimed in claim 1 wherein the organic filler contained in said pelletized material includes at least one of styrene-butadiene rubber, acrylonitrile-butadiene rubber, acrylic rubber, butyl rubber and isoprene rubbber.

3. A method of manufacturing a disk brake pad as claimed in claim 2 wherein said pelletized material contains a total of 15–40% by volume of rubber and binder resin.

4. A method of manufacturing a disk brake pad as claimed in claim 1 wherein said pelletized material contains a total of 15–40% by volume of rubber and binder resin.

5. A method of manufacturing a disk brake pad as claimed in claim 1 wherein said pelletized material has an average pellet diameter between 0.1 mm and 3 mm, and said rubber powder and said thermosetting resin powder deform or melt by heat and serve as a binder to maintain the pelletized material in the shape of pellets.

6. A method of manufacturing a disk brake pad as claimed in claim 5 wherein said thermosetting resin is one that flows at a temperature between 60° C. and 200° C.

7. A method of manufacturing a disk brake pad as claimed in claim 6 wherein said rubber powder has a Mooney viscosity at 100° C. of between 20 and 150.

8. A method of manufacturing a disk brake pad as claimed in claim 5 wherein said rubber powder has a Mooney viscosity at 100° C. of between 20 and 150.

* * * * *